US012711265B2

(12) United States Patent
Nguyen et al.

(10) Patent No.: US 12,711,265 B2
(45) Date of Patent: Aug. 18, 2026

(54) CENTRALIZED AND DECENTRALIZED DATA PROTECTION THROUGH REDACTION

(71) Applicant: T-MOBILE INNOVATIONS LLC, Overland Park, KS (US)

(72) Inventors: Phi Hoang Nguyen, Bellevue, WA (US); Kevin Ka-Kin Lau, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 199 days.

(21) Appl. No.: 17/966,394

(22) Filed: Oct. 14, 2022

(65) Prior Publication Data

US 2024/0126916 A1 Apr. 18, 2024

(51) Int. Cl.

*G06F 21/62* (2013.01)
*G06F 21/60* (2013.01)
*G06F 40/40* (2020.01)
*H04L 9/40* (2022.01)

(52) U.S. Cl.

CPC ........ *G06F 21/6245* (2013.01); *G06F 21/602* (2013.01); *G06F 40/40* (2020.01); *H04L 63/1483* (2013.01)

(58) Field of Classification Search

CPC .... G06F 21/6245; G06F 40/40; G06F 21/602; H04L 63/1483

See application file for complete search history.

(56) References Cited

U.S. PATENT DOCUMENTS 10,474,836 B1 * 11/2019 Cieslak ................. H04L 63/083
11,470,113 B1 * 10/2022 Orhan ................. H04L 63/1425
11,949,840 B1 * 4/2024 Lau ..................... G06F 21/6245
2003/0014625 A1 * 1/2003 Freed .................. H04L 63/0485 713/153
2006/0095758 A1 * 5/2006 Kim ...................... H04L 63/061 713/151
2009/0208142 A1 * 8/2009 Treadwell ............ G06F 40/295 382/321
2012/0137368 A1 * 5/2012 Vanstone ................ G06F 21/60 726/25

(Continued)

*Primary Examiner* — Daniel B Potratz
*Assistant Examiner* — Matthias Habtegeorgis
(74) *Attorney, Agent, or Firm* — Shook, Hardy & Bacon L.L.P.

(57) ABSTRACT

Methods, media, and systems are provided for centralized and decentralized protection of sensitive data. Sensitive data, for example, may include personal user data or data protected by data privacy regulations. A router may receive data from a user device. In an embodiment, the data may be received from an application that is managed by a Kubernetes cluster. In some embodiments, the application provides an active user interface that includes one or more sensitive fields for entering sensitive data. A machine learning model may be used to detect that the data being received by the router includes sensitive data. Additionally, the machine learning model may detect an entry of sensitive data at one or more sensitive fields on one or more active user interfaces. The machine learning model may be trained using a plurality of application programming interface requests. A masking technique may be applied to the sensitive data.

19 Claims, 8 Drawing Sheets

(56) References Cited

U.S. PATENT DOCUMENTS

| | | | | |
|---|---|---|---|---|
| 2013/0067225 | A1* | 3/2013 | Shochet | H04L 9/0662 713/165 |
| 2014/0198335 | A1* | 7/2014 | Atmakur | G06K 15/4095 358/1.14 |
| 2014/0337460 | A1* | 11/2014 | Mohaisen | H04L 9/005 709/213 |
| 2016/0006760 | A1* | 1/2016 | Lala | G06F 21/51 726/23 |
| 2016/0359831 | A1* | 12/2016 | Berlin | H04L 63/08 |
| 2017/0346792 | A1* | 11/2017 | Nataros | H04L 63/0428 |
| 2019/0019154 | A1* | 1/2019 | Girdhar | H04W 12/06 |
| 2019/0356719 | A1* | 11/2019 | Povar | H04L 67/02 |
| 2020/0034832 | A1* | 1/2020 | Korpal | G06Q 20/385 |
| 2020/0053059 | A1* | 2/2020 | Huang | H04L 63/101 |
| 2020/0334381 | A1* | 10/2020 | Yarowsky | G06F 40/166 |
| 2021/0194888 | A1* | 6/2021 | Bhaskar S | G06F 16/3347 |
| 2021/0208961 | A1* | 7/2021 | Dutta | G06F 11/0772 |
| 2021/0304143 | A1* | 9/2021 | Lucas | G06F 21/6245 |
| 2022/0222372 | A1* | 7/2022 | Larson | G06N 20/00 |
| 2022/0385647 | A1* | 12/2022 | Pabón | H04L 63/08 |
| 2023/0214248 | A1* | 7/2023 | Sancheti | G06F 16/951 718/1 |
| 2023/0229246 | A1* | 7/2023 | Gerhard | G06F 3/0238 715/700 |
| 2023/0396438 | A1* | 12/2023 | Mahoney | H04L 9/0825 |
| 2023/0403256 | A1* | 12/2023 | Sheedy | G06F 16/9566 |
| 2023/0421562 | A1* | 12/2023 | Hakim | H04L 41/16 |
| 2024/0061952 | A1* | 2/2024 | Kwok | G06F 21/6245 |
| 2024/0118938 | A1* | 4/2024 | Coviello | G06F 16/24568 |
| 2024/0119170 | A1* | 4/2024 | Xu | G06F 40/295 |

* cited by examiner

CENTRALIZED AND DECENTRALIZED DATA PROTECTION THROUGH REDACTION

SUMMARY

A high-level overview of various aspects of the technology disclosed herein is provided here for that reason, to provide an overview of the disclosure and to introduce a selection of concepts that are further described in the Detailed Description section below. This Summary is not intended to identify key features or essential features of the claimed subject matter, nor is it intended to be used as an aid in isolation to determine the scope of the claimed subject matter. The present disclosure is directed, in part, to systems and methods for centralized and decentralized data protection (e.g., through redaction), substantially as shown in and/or described in connection with at least one of the figures, and as set forth more completely in the claims.

In aspects set forth herein, and at a high level, the systems, methods, and media disclosed herein include receiving, by a router, data from one or more user devices. One or more machine learning models are used to determine that the data being received includes sensitive data. Sensitive data may include, for example, personal user data or data protected by data privacy regulations. The one or more machine learning models may also detect an entry of sensitive data (e.g., at a sensitive field on an active user interface) at a user device. In some embodiments, the one or more machine learning models may also detect, via one or more audio sensors, an audio communication that includes sensitive data.

The one or more machine learning models may be trained using a plurality of application programming interface (API) requests. For example, the plurality of API requests may be for a security token for encrypting data. In embodiments, the API requests may be from a plurality of applications, each hosted by one or more container orchestration platforms. Each of the plurality of applications may provide sensitive fields on user interfaces of each application. The one or more machine learning models may also be trained to detect a particular format associated with numbers (e.g., a credit card number, a social security number, a telephone number, and numbers corresponding to a particular biometric). In some embodiments, the one or more machine learning models are trained to identify software application updates for identifying compliance standards for sensitive data (e.g., Customer Proprietary Network Information).

Based on detecting, by using the one or more trained machine learning models, that the data being received at a user device or at a router includes sensitive data, a masking technique is applied prior to transmitting the sensitive data (e.g., from an API gateway, from the router). For example, the sensitive data may be encrypted or tokenized prior to transmitting the sensitive data from an API gateway, such that the sensitive data is masked as it enters the network and as it is transmitted throughout the layers on the network. Additionally, at least a portion of the sensitive data may be redacted from display as the sensitive data is being received on the active user interface.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
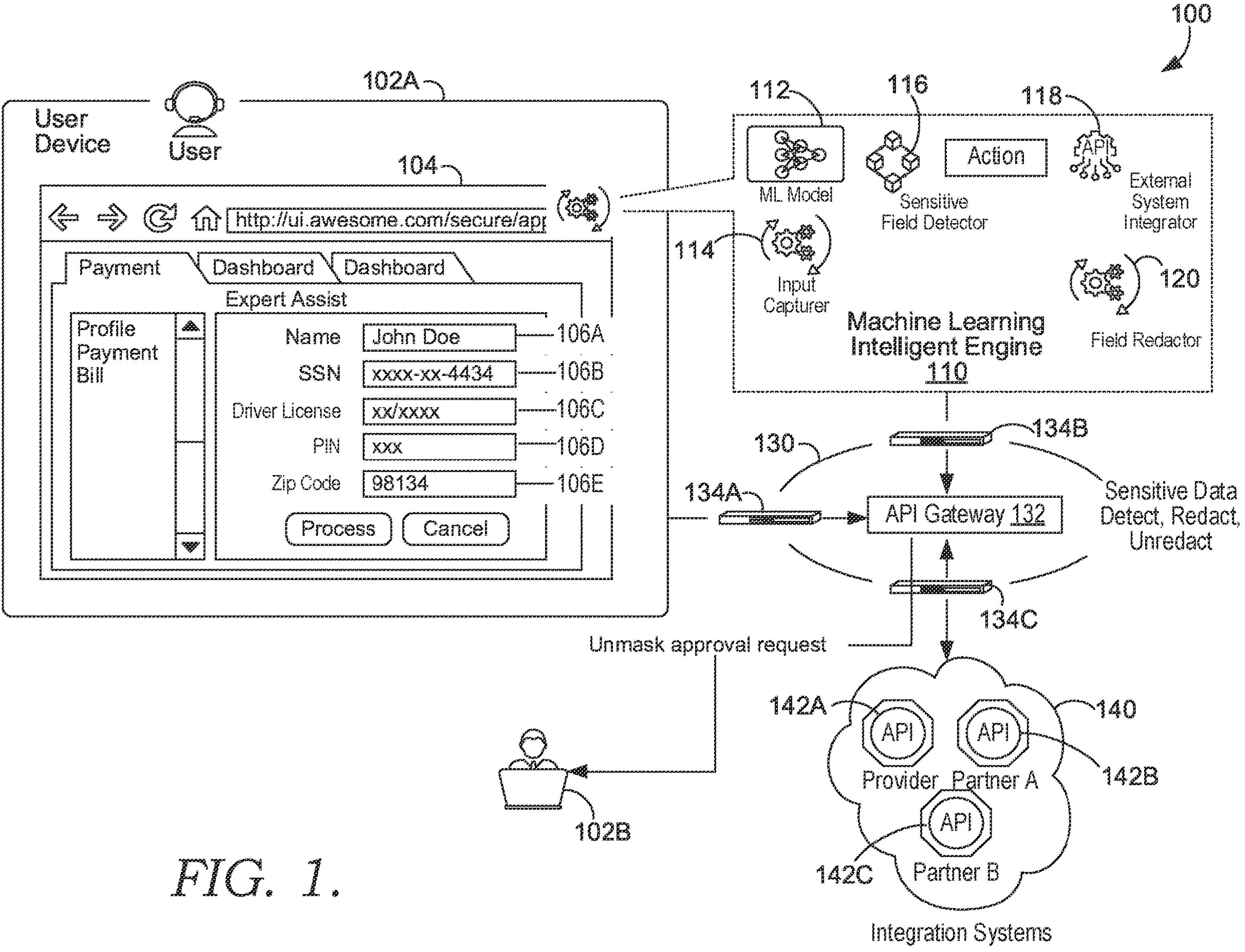
FIG. 1 depicts an example environment (e.g., at a high level) for redacting or otherwise securing sensitive data using machine learning, in accordance with embodiments herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3 G Third-Generation Wireless Technology
4 G Fourth-Generation Cellular Communication System
5 G Fifth-Generation Cellular Communication System
6 G Sixth-Generation Cellular Communication System
AOA Angle of Arrival
API Application Programming Interface
CA Carrier Aggregation
CD-ROM Compact Disk Read Only Memory CDMA Code Division Multiple Access
DVD Digital Versatile Discs
EEPROM Electrically Erasable Programmable Read Only Memory
eNB Evolved Node B
Ev-DO Evolution-Data Optimized
FD-MIMO Full-Dimension Multiple-Input Multiple-Output
gNB Next Generation Node B
GPRS General Packet Radio Service
GSM Global System for Mobile communications
HSS Home Subscriber System
IEEE Institute of Electrical and Electronics Engineers
IP Internet Protocol
LTE Long Term Evolution
MAC Media Access Control
MIMO Multiple-Input Multiple-Output
MME Mobility Management Entity
MU-MIMO Multi-User Multiple-Input Multiple-Output
NR New Radio
OTDOA Observed Time Difference of Arrival
PC Personal Computer
PDA Personal Digital Assistant
RAM Random Access Memory
RAN Radio Access Node
RF Radio-Frequency
ROM Read Only Memory
RRC Radio Resource Control
RRU Remote Radio Unit
RSRP Reference Transmission Receive Power
RSRQ Reference Transmission Receive Quality
RSSI Received Signal Strength Indicator
RTT Round-Trip Time
TCP Transmission Control Protocol
TDMA Time Division Multiple Access
TOA Time of Arrival
UDP User Datagram Protocol
UE User Equipment
VoNR Voice over NR
VoLTE Voice over LTE
WiMAX Worldwide Interoperability for Microwave Access In addition, words such as "a" and "an," unless otherwise indicated to the contrary, may also include the plural as well as the singular. Thus, for example, the constraint of "a feature" is satisfied where one or more features are present. As such, an element in the singular may refer to "one or more."

Further, the term "or" includes the conjunctive, the disjunctive, and both (a or b thus includes either a or b, as well as a and b).

In addition, the term "some" may refer to "one or more."

The term "combination" (e.g., one or more combinations thereof) may refer to, for example, "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.). Other combinations may include more or less than three options associated with the A, B, and C examples.

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Additionally, "user device," as used herein, is a device that has the capability of using a wireless communications network, and may also be referred to as a "computing device," "mobile device," "user equipment" (UE), or "wireless communication device." A user device, in some aspects, may take on a variety of forms, such as a PC, a laptop computer, a tablet, a mobile phone, a PDA, a server, an Internet of Things device, any other device capable of communicating with other devices (e.g., by transmitting or receiving a signal) using a wireless communication, or one or more combinations thereof. A user device may be, in an embodiment, similar to user devices 102A, 102B described herein with respect to FIG. 1. A user device may also be, in another embodiment, similar to user device 800, described herein with respect to FIG. 8.

As noted above, the user device may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, a drone, a remote weather station, another wireless communication device, or one or more combinations thereof.

A user device may additionally include internet-of-things devices, such as one or more of the following: a sensor, controller (e.g., a lighting controller, a thermostat), appliances (e.g., a smart refrigerator, a smart air conditioner, a smart alarm system), other internet-of-things devices, or a combination thereof. Internet-of-things devices may be stationary, mobile, or both. In some embodiments, the user device is associated with a vehicle (e.g., a video system in a car capable of receiving media content stored by a media device in a house when coupled to the media device via a local area network). In some embodiments, the user device comprises a medical device, a location monitor, a clock, other wireless communication devices, or a combination thereof.

In embodiments, a user device discussed herein may be configured to communicate using one or more of 4 G (e.g., LTE), 5 G, 6 G, another generation communication system, or a combination thereof. In some aspects, the UE has a radio that connects with a 4 G cell site but is not capable of connecting with a higher generation communication system. In some aspects, the UE has components to establish a 5 G connection with a 5 G gNB, and to be served according to 5 G over that connection. In some aspects, the user device may be an E-UTRAN New Radio—Dual Connectivity (ENDC) device. ENDC allows a user device to connect to an LTE eNB that acts as a master node and a 5 G gNB that acts as a secondary node. As such, in these embodiments, the ENDC device may access both LTE and 5 G simultaneously, and in some cases, on the same spectrum band.

As used herein, the term "cell site" generally refers to one or more cellular base stations, nodes, RRUs control components, other components configured to provide a wireless interface between a wired network and a wirelessly connected user device, or a combination thereof. A cell site may comprise one or more nodes (e.g., eNB, gNB, other nodes, or one or more combinations thereof) that are configured to communicate with user devices. In some aspects, the cell site may include one or more band pass filters, radios, antenna arrays, power amplifiers, transmitters/receivers, digital signal processors, control electronics, GPS equipment, other equipment, or a combination thereof. A node (e.g., eNB or gNB) corresponding to the cell site may comprise one or more of a macro base station, a small cell or femtocell base station, a relay base station, another type of base station, or one or more combinations thereof. In aspects, the cell site may be configured as FD-MIMO, massive MIMO, MU-MIMO, cooperative MIMO, 3 G, 4 G, 5 G, 6 G, another generation communication system, or one or more combinations thereof. In addition, the cell site may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior computing systems receive and store large volumes of sensitive data. For example, applications or websites for banking, ecommerce, social media, travel, stock trading or other types of trading, or payment services collect and store sensitive data (e.g., sensitive personal user data), including but not limited to: names, addresses, birthdates, passport numbers, credit card numbers, social security numbers, and personal health information on a computing system. If sensitive data (e.g., sensitive data protected by data privacy regulations) is intercepted (e.g., during the transmission of the sensitive data from a router to a point in the network or between transfers from one point to another point in the network), fraud, identify theft, monetary theft, another type of harm, or one or more combinations thereof can occur. As another example, a security breach can also result in consumer distrust in an organization.

Generally, prior computing systems and methods that receive and store sensitive data do not provide ways in which to secure sensitive data throughout and across the network at all layers of the network. For example, prior computing systems and methods could block other users from viewing a password for an application at only the application layer of a network (e.g., a network having an Open Systems Interconnection model with a physical layer (e.g., cable), data link layer (e.g., switches), a network layer (e.g., IP or routers), a transport layer (e.g., TCP, UDP, port numbers), a session layer, a presentation layer, and the application layer). As such, the sensitive data is not protected as the sensitive data is transmitted across the network layers and other layers (e.g. of the Open Systems Interconnection model or TCP/IP model having four layers including a network access layer, an internet layer, a transport layer or host-to-host layer, and application layer). As such, sensitive data was exposed to interception, for example, when being transmitted from a network layer (e.g., IP or routers) to another layer. As a result, the intercepted sensitive data could be used for fraud, theft (e.g., identity theft or monetary theft), or other types of harm.

The technology discussed herein can alleviate the problems and shortcomings discussed above. For instance, embodiments disclosed herein provide for protecting sensitive data as it is transmitted across the various layers of the network (e.g., from a network layer (e.g., IP or routers) to another layer). In one embodiment, a system comprising at least one machine learning model, one or more processors, and computer memory is provided. The computer memory can store computer-usable instructions that, when executed by the one or more processors, perform operations comprising detecting, by using the at least one machine learning model, an entry of sensitive data at a sensitive field on an active user interface. Based on detecting the entry of the sensitive data at the sensitive field, the operations comprise redacting at least a portion of the sensitive data as the sensitive data is being received on the active user interface. The operations also comprise encrypting the sensitive data received prior to transmitting the sensitive data from an application programming interface gateway.

In another aspect, a computerized method for centralized and decentralized data protection is provided. The method comprises receiving, by a router, data from at least one user device. The method also comprises detecting, by using at least a machine learning model trained using a plurality of application programming interface requests, that the data being received by the router includes sensitive data. Further, the method also comprises applying, based on detecting that the data being received by the router includes the sensitive data, a masking technique to at least a portion of the sensitive data received prior to transmitting the sensitive data from an application programming interface gateway.

In yet another aspect, non-transitory computer-readable media are provided. The non-transitory computer-readable media have computer-usable instructions embodied thereon that, when executed by a processor, perform operations for centralized and decentralized data protection. The operations comprise receiving, by a router and from a user device, sensitive data. The operations also comprise detecting, by using at least a machine learning model, the sensitive data based on an entry of the sensitive data at the user device and based on receiving the sensitive data at the router. Additionally, the operations also comprise applying, based on detecting the sensitive data, a masking technique to at least a portion of the sensitive data received prior to transmitting the sensitive data to a layer within a network.

Turning now to FIG. 1, example environment 100 comprises user devices 102A, 102B; active user interface 104, sensitive data 106A, 106B, 106C, 106D, 106E; machine learning intelligent engine 110 comprising one or more machine models 112, input capturer 114, sensitive field detector 116, external system integrator 118, and field redactor 120; network 130 comprising API gateway 132 and a plurality of routers (e.g., routers 134A, 134B, 134C); and integration system 140 comprising a plurality of communication service providers (e.g., provider 142A and partners 142B, 142C). Example environment 100 is but one example of a suitable environment for securing centralized and decentralized sensitive data in a wireless communication network, and is not intended to suggest any limitation as to the scope of use or functionality of the invention. Neither should the environment 100 be interpreted as having any dependency or requirement relating to any one or combination of components illustrated.

As depicted by example environment 100, user devices 102A, 102B may wirelessly communicate via network 130. User devices 102A, 102B can communicate using one or more wireless communication standards. For example, the user devices 102A, 102B may be configured to communicate using a wireless networking (e.g., Wi-Fi) or one or more peer-to-peer wireless communication protocols (e.g., Bluetooth, Wi-Fi peer-to-peer, other peer-to-peer protocols, or one or more combinations thereof) in addition to at least one cellular communication protocol (e.g., GSM, UMTS (associated with WCDMA or TD-SCDMA air interfaces, for example), LTE, LTE-A, 5 G NR, HSPA, 3 GPP2 CDMA2000 (e.g., 1×RTT, 1×EV-DO, HRPD, eHRPD), other cellular communication protocols, or one or more combinations thereof). The user devices 102A, 102B may additionally or alternatively communicate using one or more global navigational satellite systems (GNSS, such as GPS or GLONASS for example), one or more mobile television broadcasting standards (e.g., ATSC-M/H or DVB-H), another wireless communication protocol, or one or more combinations thereof. In some embodiments, the user devices 102A, 102B may include separate transmit or receive chains (e.g., including separate antennas and other radio components) for each wireless communication protocol with which it is configured to communicate.

User device 102A comprises active user interface 104, which includes sensitive data 106A, 106B, 106C, 106D, 106E. "Sensitive data" (e.g., sensitive personal user data) may include, but is not limited to: names, addresses, birthdates, passport numbers, credit card numbers, social security numbers, biometrics data, and personal health information on a computing system. In some embodiments, sensitive data includes data protected by data privacy regulations, such as General Data Protection Regulation (GDPR) or Health Insurance Portability or Accountability Act (HIPAA), for example. To illustrate, an email address such as water567@xyz.com that uniquely identifies a person is sensitive data under GDPR.

In example environment 100, sensitive data 106A includes a first and last name. In other embodiments, sensitive data may include one or more middle names. In example environment 100, the sensitive data 106B is a social security number. In other embodiments, the sensitive data may include one or more of a national identification number, a national identity number, a national insurance number, or another type of identification number. In example environment 100, sensitive data 106C includes a driver license number. In example environment 100, sensitive data 106D includes a pin number. In example environment 100, sensitive data 106E includes a zip code.

The machine learning intelligent engine 110 can detect sensitive data 106A, 106B, 106C, 106D, 106E being typed or audibly entered at the active user interface 104. In other embodiments, machine learning intelligent engine 110 can detect sensitive fields (or other types of entry points for receiving sensitive data) that can receive sensitive data at one or more inactive user interfaces. For example, one or more machine learning models 112 may be used for detecting sensitive data 106A, 106B, 106C, 106D, 106E or other types of sensitive data. The one or more machine learning models 112 may include one or more neural networks, such as DeepAR (a supervised learning algorithm for forecasting scalar one-dimensional time series using recurrent neural networks), Multi-Quantile Recurrent Neural Network, sequence models, other types of neural networks; one or more clustering-based learning schemes; one or more other types of machine learning models, or one or more combinations thereof. The machine learning intelligent engine 110 may also utilize other techniques, such as exponential smoothing or autoregressive integrated moving average, for example.

The one or more machine learning models 112 can be trained using a plurality of application programming interface requests (e.g., from one or more websites or one or more applications), such that the machine learning intelligent engine 110 detects the sensitive data being received by a user device prior to one or more of the routers 134A, 134B, 134C transmitting the sensitive data within the network 130. For example, the plurality of API requests used to train the one or more machine learning models may each correspond to a request for a security token for encrypting one or more types of sensitive data. Continuing the example, the API requests may each be partitioned by attribute (e.g., values or characters associated with a name or description). In some embodiments, each of the partitioned API requests can be labeled based on one or more format patterns of the sensitive data (e.g., a telephone number format having an area code, a three digit code, and a four digit code; or a telephone number that also includes a country code). In some embodiments, each of the partitioned API requests can be labeled based on one or more of the attributes or based on the type of sensitive data (e.g., credit card CVV code, credit card expiration date). In some embodiments, the one or more machine learning models 112 can be trained based on the training method described in operational environment 500 of FIG. 5.

Machine learning intelligent engine 110 can detect sensitive data (e.g., sensitive data 106A-106E on active user interface 104 or other sensitive data from another active user interface or from one or more inactive user interfaces) using input capturer 114 and sensitive field detector 116, for example. In some embodiments, machine learning intelligent engine 110 may use natural language processing to detect a particular format of the sensitive data (e.g., a format for a social security number or email address) or to detect domain names corresponding to the sensitive data, for example. As another example, a medical professional identifier may have a prefix or suffix such as "Dr." "MD," or "RN" that is associated with an individual's name, which can be sensitive data under HIPAA. As such, the machine learning intelligent engine 110 may detect one or more professional identifiers based on a particular format or pattern associated with sensitive data, such as prefixes and suffixes, for example.

In embodiments, the machine learning intelligent engine 110 can detect that sensitive data is being entered or that sensitive data is about to be entered (e.g., entered at active user interface 104)(e.g., detecting via one or more calls from an application to an API using the external system integrator 118 of the machine learning intelligent engine 110). For example, the machine learning intelligent engine 110 can detect that an application has called to an API for a security token for encrypting sensitive data. In some embodiments, the API may be supported by an operating system that enables execution of the application. Calls from an application to the API may be included in the source code of a software application by, for example, a computer programmer. In some embodiments, machine learning intelligent engine 110 can detect that sensitive data is being received by an audio sensor, or that a personal digital assistant is receiving sensitive data.

The field redactor 120 can redact sensitive data based on detecting that sensitive data is being entered on a sensitive field of a website or application (or based on the sensitive data being received at a personal digital assistant, or being received by an audio sensor or a user device, or being received by one or more routers thereafter, for example), the field redactor 120 can apply a masking technique to at least a portion of the sensitive data prior to the sensitive data being transmitted from an API gateway (e.g., from the external system integrator 118 of the machine learning intelligent engine 110 or from the router 134A or 134B) and prior to being transmitted throughout network 130. In embodiments, the masking technique comprises tokenizing the sensitive data prior to transmitting the sensitive data from the external system integrator 118 of the machine learning intelligent engine 110. In embodiments, the masking technique comprises tokenizing the sensitive data prior to transmitting the sensitive data from the router 134A or 134B. In some embodiments, the masking technique comprises redacting the sensitive data from display (e.g., on active user interface 104) on a user device. For example, the redaction may occur in real-time as a user is typing into the sensitive field.

As indicated above, the masking technique is applied prior to the sensitive data being transmitted throughout network 130. The network 130, for example, may provide one or more communication services. The one or more communication services may include, for example, the transfer of information without the use of an electrical conductor as the transferring medium. A wireless communication service may correspond to the transfer of information via radio waves (e.g., Bluetooth), satellite communication, infrared communication, microwave communication, Wi-Fi, millimeter wave communication, mobile communication, another type of communication, or a combination thereof. In embodiments, the communication service may include one or more of a voice service, a message service (e.g., SMS messages, MMS messages, instant messaging messages, an EMS service messages), a data service, other types of wireless telecommunication services, or a combination thereof. In embodiments, the one or more communication services may be provided by one or more communication providers. For example, a user device may correspond to a user who is registered or subscribed to a communication service provider to utilize one or more communication services.

In some embodiments, the machine learning intelligent engine 110 applies the masking technique by router 134B prior to the router 134B transmitting the sensitive data by voice service, a message service, a data service, other types of wireless telecommunication services, or a combination thereof. In some embodiments, the machine learning intelligent engine 110 applies the masking technique by router 134B prior to the router 134B transmitting the sensitive data by one or more communication providers that the user (e.g., the user who entered the sensitive data) is registered or subscribed with for utilizing one or more communication services. In some embodiments, the system of FIG. 1 transmits the masked sensitive data via radio waves, satellite communication, infrared communication, microwave communication, Wi-Fi, millimeter wave communication, mobile communication, another type of communication, or one or more combinations thereof.

The network 130 may correspond to one or more of 3 G, 4 G, 5 G, 6 G, another generation communication system, 802.11, millimeter waves, FD-MIMO, massive MIMO, MU-MIMO, cooperative MIMO, another type of communication system, or one or more combinations thereof. Additionally, other wireless communication protocols may be utilized in conjunction with aspects described herein. For example, embodiments of the present technology may be used with one or more wireless communication protocols or standards, including, but not limited to, CDMA 1×Advanced, GPRS, Ev-DO, TDMA, GSM, WiMAX technology, LTE, LTE Advanced, other technologies and standards, or a combination thereof.

In embodiments, one or more cell sites provide the one or more wireless communication services via network 130, the network 130 comprising one or more telecommunication networks, or a portion thereof. A telecommunication network might include an array of devices or components (e.g., one or more cell sites). The network can include multiple networks, and the network can be a network of networks. In embodiments, the network is a core network, such as an evolved packet core, which may include at least one MME, at least one serving gateway, and at least one Packet Data Network gateway. The MME may manage non-access stratum (e.g., control plane) functions such as mobility, authentication, and bearer management for other devices associated with the evolved packet core. In an embodiment, the network 130 comprises at least two core networks associated with a legacy LTE network and a 5 G network. The at least two core networks may each operate one or more public land mobile networks, which may operate in each of the at least two core networks (e.g., one public land mobile network operates in each of an evolved packet core and a 5 G core network). In embodiments, different core networks may be provided for different types of services, for different types of customers, for different types of traffic, to provide different levels of Quality of Service, or one or more combinations thereof. The network 130 can comprise any communication network providing voice, message, or data service(s), such as, for example, a 1× circuit voice, a 3 G network (e.g., CDMA, CDMA2000, WCDMA, GSM, UMTS), a 4 G network (WiMAX, LTE, HSDPA), a 5 G network, a 6 G network, another generation network, or one or more combinations thereof.

Components of the network 130, such as terminals, links, and nodes (as well as other components), can provide connectivity in various implementations. For example, components of the network 130 may include core network nodes, relay devices, integrated access and backhaul nodes, macro eNBs, small cell eNBs, gNBs, relay cell sites, other network components, or a combination thereof. The network 130 may interface with one or more cell sites through one or more wired or wireless backhauls. As such, the one or more cell sites may communicate to devices via the network 130 or directly. Furthermore, user devices can utilize the network 130 to communicate with other devices (e.g., a user device (s), a server(s), etc.) through the one or more cell sites.

API gateway 132 of network 130 may include one API or a plurality of APIs that each receive distributed requests (e.g., from a monolithic application). API gateway 132 may be configured to route requests for one or more operations to one or more endpoints within network 130. For example, API gateway 132 can be configured via a configuration file for directing routing requests received (e.g., API requests from an application for a security token for encryption), such that the configuration file specifies one or more endpoints within network 130 for processing. In embodiments, each API gateway of the API gateway 132 can be configured individually, such that routing requests received by the corresponding API are directed differently. In some embodiments, the API gateway 132 includes an HTTPS interface configured to use HTTPS requests (e.g., HTTPS GET operation to retrieve information associated with applications having sensitive fields). In some embodiments, the API gateway 132 can invoke one or more agents of network 130 to obtain traffic events associated with the network 130 and an application having sensitive fields, for example.

In embodiments, one or more of the routers 134A, 134B, 134C are edge routers that are located at a boundary of network 130 (e.g., for hosting a logical network gateway for the network 130). In some embodiments, edge routers 134A, 134B, 134C have different remote tunnel endpoints. The edge routers 134A, 134B, 134C may route API requests from applications according to overlay network routes or according to virtualized private communications that use a VPN server. For example, a network route may be utilized as a default route if one or more of the edge routers 134A, 134B, 134C fail to identify a match in a lookup table for network traffic associated with an API request. In some embodiments, the edge routers 134A, 134B, 134C may include one or more single branch edge routers, one or more multi-branch edge routers, one or more aggregation edge routers, or one or more combinations thereof. The machine learning intelligent engine 110 can detect and mask the sensitive data (received at a user device, for example), prior to the sensitive data being transmitted from one or more of the edge routers 134A, 134B and into the network 130 (e.g., prior to the network layer of network 130 receiving the sensitive data).

Integration system 140 comprises a plurality of communication service providers (e.g., provider 142A and partners 142B, 142C). Integration system 140 may implement network 130 to allow clients, operators, users, or other customers to use, access, operate, or otherwise control one or more computing resources or wireless communication services hosted within the network 130. For example, the integration system 140 may provide computing resources (e.g., to clients) in the form of reserved computing instances (e.g., a virtual machine acting as a distinct logical computing system allowing users to operate or administer a hardware computing resource). In embodiments, the provider 142A or partners 142B, 142C of the integration system 140 may manage a user device connection to one or more of the routers 134A, 134B, 134C.

Figure 2:
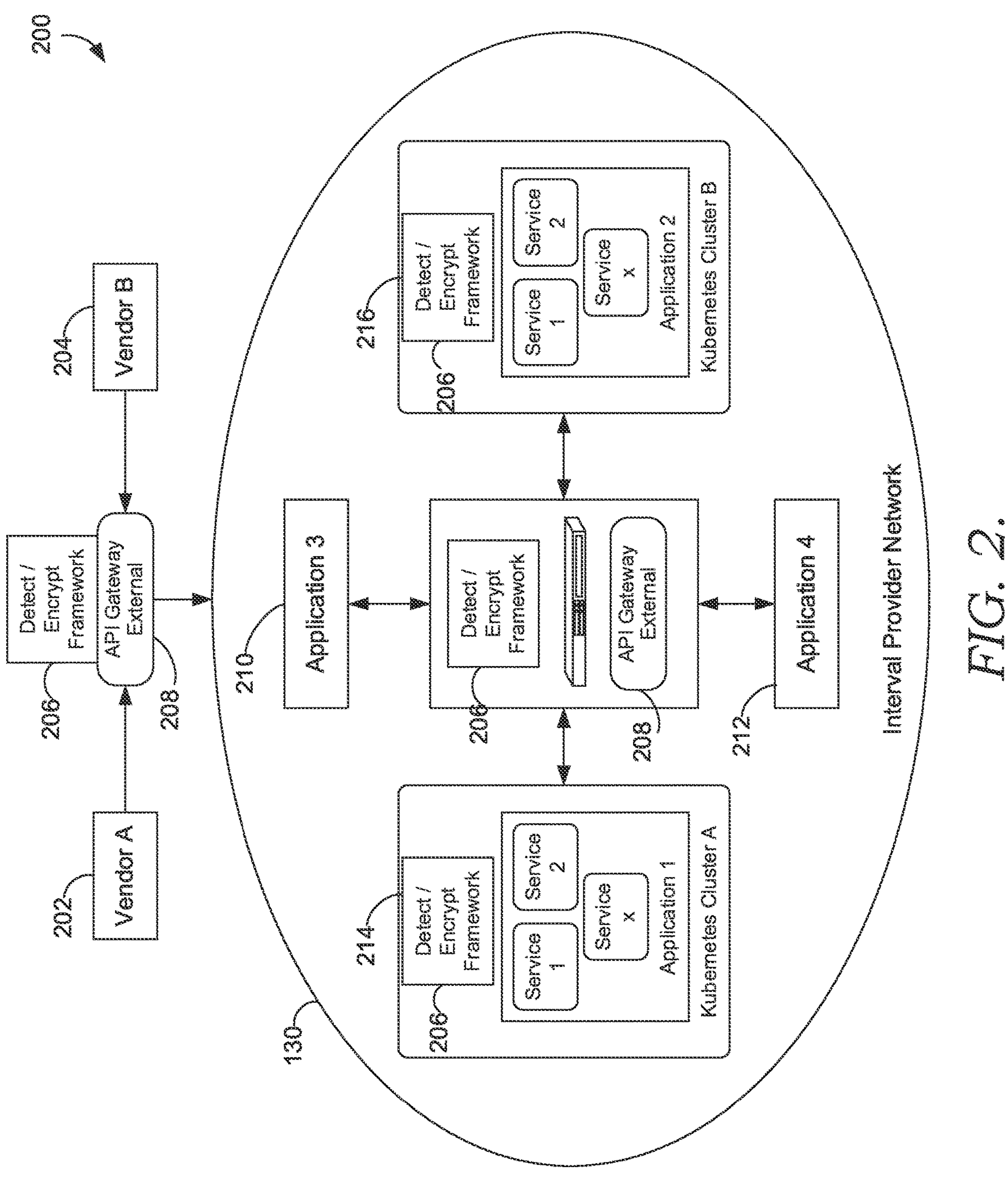
FIG. 2 illustrates an example environment for detecting and securing sensitive data that flows in, out, and throughout a network, in accordance with embodiments herein.

FIG. 2 illustrates an example environment 200 for protecting sensitive data internal and external to a network 130 (e.g., the network 130 described herein with respect to FIG. 1). For example, example environment 200 comprises vendor A 202, vendor B 204, detection and encryption framework 206 (e.g., the machine learning intelligent engine 110 of FIG. 1) that encrypts sensitive data at one or more API gateways 208 (e.g., API gateway 132 of FIG. 1) external to the network 130, applications 210, 212, and Kubernetes® clusters 214, 216, which each hosts the detection and encryption framework 206 and an application that provides a plurality of services. Example environment 200 is but one example of a suitable environment for securing centralized and decentralized sensitive data in a wireless communication network, and is not intended to suggest any limitation as to the scope of use or functionality of the invention. Neither should the environment 200 be interpreted as having any dependency or requirement relating to any one or combination of components illustrated.

In some embodiments, one or more training model algorithms corresponding to the one or more machine learning models (for detecting sensitive data) of the detection and encryption framework 206 are installed on a Kubernetes container of one or more of the Kubernetes clusters 214, 216. A Kubernetes cluster, for example, comprises an API server, a scheduler for the selection of nodes (e.g., one or more virtual machines, one or more physical servers) for containers to run on, and a manager for controllers (e.g., endpoint controllers, replication controllers, daemonset controllers, job controllers). The Kubernetes cluster is described by way of example, and those skilled in the art will appreciate that the disclosed techniques can derive from one or more other types of container orchestrators that function the same or similarly, and may be employed in place of the Kubernetes cluster.

The Kubernetes clusters 214, 216 are a type of container orchestration platform that provides a platform for automating deployment, scaling, and operations of application containers across clusters of hosts. The Kubernetes cluster provides flexibility in application development and also provides a plurality of tools for scaling. In the Kubernetes cluster, containers are grouped into a logical unit "pod." Containers within the same pod share the same resources and network, and maintain a degree of isolation from containers in other pods. The pods are distributed across nodes of the Kubernetes cluster. In embodiments, each node includes a host operating system (e.g., Linux®) and a container engine that executes on top of the host operating system supporting the containers of the pod. Kubernetes control plane components (e.g., a Kubelet responsible for running a state of a plurality of nodes and monitors the state of a pod) execute on the host operating system alongside the containers. As such, a node includes multiple containers and control plane components executing on a shared operating system.

In some embodiments, a Kubernetes master node that controls each node of a Kubernetes cluster employs machine learning, based on one or more inputs received at one or more user devices (e.g., an input received at a sensitive field on an active user interface of a webpage or application or an audio input received by an audio sensor) or based on a router receiving sensitive data for the detection of the sensitive data being received by the one or more user device, the router (e.g., edge routers 134A, 134B of FIG. 1), or a combination thereof. For example, the Kubernetes master node can employ sensitive data detection rules to orchestrate worker nodes and pods of the Kubernetes cluster, wherein the worker nodes and pods are associated with a network provider (e.g., provider 142A of FIG. 1). The master node may be implemented by one or more virtual machines, one or more physical machines, or one or more combinations thereof.

In some embodiments, one or more machine learning models (e.g., one or more machine models 112 of machine learning intelligent engine 110 of FIG. 1) of the detection and encryption framework 206 are trained using one or more API requests (e.g., requests for security tokens for encryption) from a plurality of applications managed one or more container orchestration platforms, such as Kubernetes clusters 214, 216. Once trained, the one or more machine learning models (e.g., installed on a Kubernetes container of one or more of the Kubernetes clusters 214, 216) of the detection and encryption framework 206 can detect and subsequently provide a masking technique to the sensitive data protected. In some embodiments, the one or more machine learning models are trained using API requests for security tokens for encryption from each of the applications hosted by the Kubernetes clusters 214, 216 and each of applications 210, 212.

In some embodiments, the detection and encryption framework 206 can detect that a website corresponding to the active user interface and the sensitive field is malicious. For example, the detection and encryption framework 206 can compare a URL and letterhead associated with the website. As another example, the detection and encryption framework 206 can identify malicious websites based at least in part on an IP destination address. In yet another example, the detection and encryption framework 206 can identify malicious websites based at least in part on the IP destination address not having access to an edge node (e.g., edge routers 134A, 134B of FIG. 1) of the network 130. Each of the malicious website detected can be stored within a database that the detection and encryption framework 206 can access. Based on the malicious websites identified, a network router (e.g., edge routers 134A, 134B of FIG. 1) can detect that a user device is transmitting sensitive data from a malicious website and prevent the transmission of the sensitive data (e.g., prior to transmitting the sensitive data from API gateway 208). Furthermore, the detection and encryption framework 206 can transmit an alert to a user device corresponding to the malicious website and sensitive data (e.g., a user device entering sensitive data at a sensitive field within the malicious website). Further, the alert can indicate that the website is malicious and that the transmission of the sensitive information was prevented.

Figure 3:
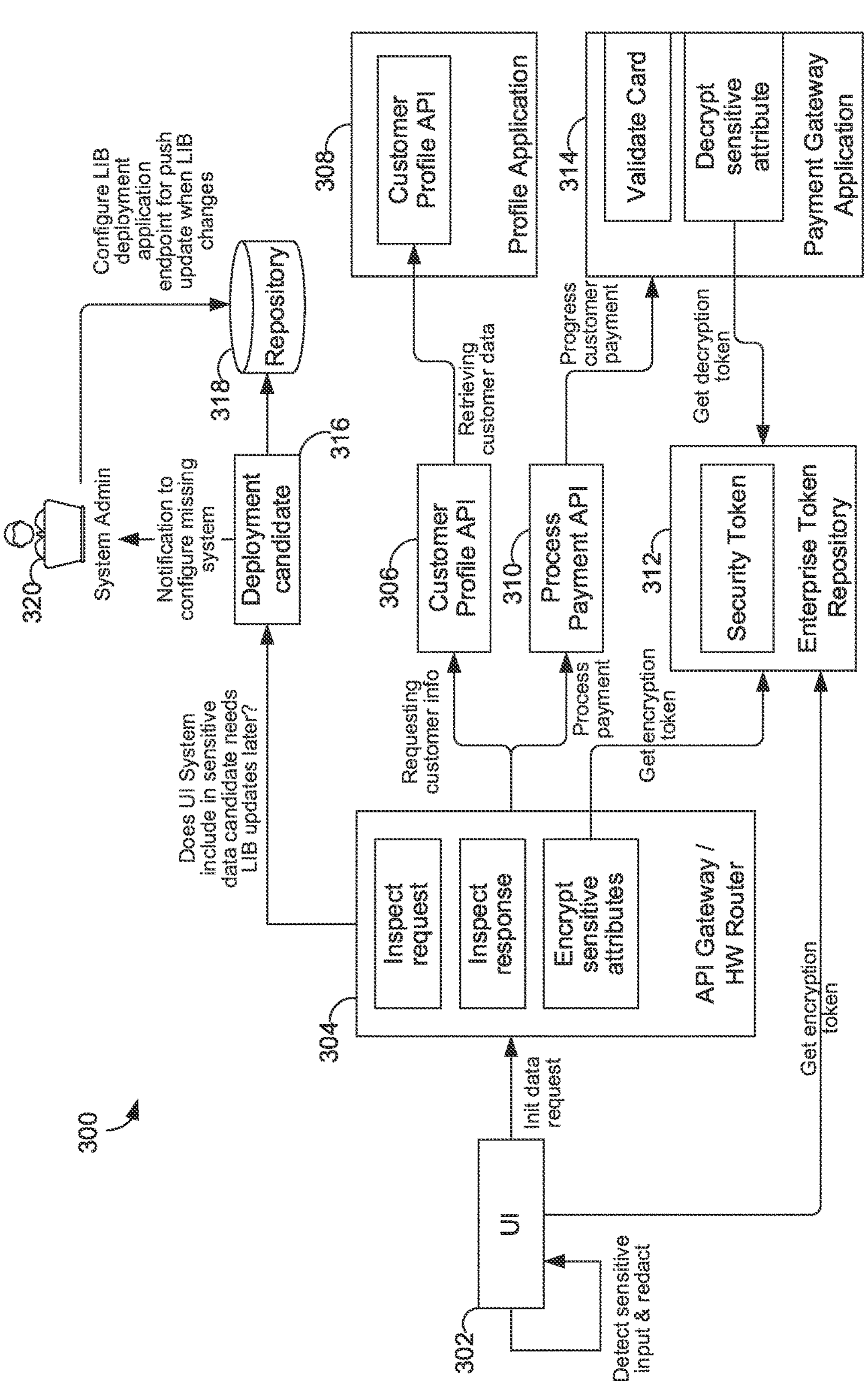
FIG. 3 depicts an example environment for securing sensitive data at the front-end, on the back-end, or via one or more combinations thereof, in accordance with embodiments herein.

FIG. 3 depicts an example environment 300 for securing sensitive data at the front-end, on the back-end, or via one or more combinations thereof. At 302, sensitive input is detected (e.g., by detection and encryption framework 206 of FIG. 2 or by machine learning intelligent engine 110 of FIG. 1) and redacted. For example, a social security number may be masked as a user is typing the social security number into a sensitive field of an active user interface. In some embodiments, based on user device permissions, the user device may provide an option to unmask at least a portion of the redacted sensitive data. At 304, an API gateway (e.g., API gateway 132 of FIG. 1 or API gateway 208 of FIG. 2) and router (e.g., edge routers 134A, 134B of FIG. 1) may inspect one or more requests received from the user device at a user interface, inspect one or more responses, or encrypt attributes of the sensitive data. For example, the API gateway or router can encrypt one or more attributes (e.g., values or characters associated with a name or description) of the sensitive data based on the type of sensitive data being encrypted (e.g., social security number or date of birth).

Based on the API gateway or router inspecting one or more requests received from the user device at a user interface, inspecting one or more responses, or encrypting attributes of the sensitive data, the API gateway or router may request data (e.g., customer info) from a profile API (e.g., a customer profile API) at 306. The profile API may have access to profile data stored at a profile store, and the profile data may include user data, such as name and address, for example. At 308, the requested data may be retrieved (e.g., from a profile application). A user device may also request to edit the profile data stored at the profile store, among other operations. At 310, API gateway or router may request for processing a payment via a process payment API. As such, at 314, the payment may be processed by, for example, validating a credit card number or decrypting a sensitive attribute of sensitive data by way of a payment gateway application. Because the API gateway or router has encrypted any sensitive data detected prior to transmitting the sensitive data to process the payment, the sensitive data has been protected across each layer of the network as the sensitive data was transmitted from the API gateway or router to subsequent endpoints.

For example, at 312, API gateway or router may request a security token at an enterprise token repository for encrypting the sensitive data detected prior to transmitting the sensitive data across a layer of the network from the API gateway or router to subsequent endpoints. The payment gateway application may also request a decryption token from the enterprise token repository for validating the payment. Furthermore, the API gateway or router may run a command to create a deployment candidate at 316 for identified policy updates, application updates, and updates to security compliance requirements for protecting sensitive data that are stored at a centralized repository 318 and to additionally notify a system administrator at 320. For example, centralized repository 318 may also store one or more matrices associated with the security compliance requirements for identifying and detecting sensitive data and maintaining protection of the sensitive data. An example matrix is provided below:

| | | | | | | | |
|---|---|---|---|---|---|---|---|
| PII | Driver | SSN | Passport | Alien ID | Financial | Medical ID | . . . |
| CPNI | Call from | Call to | Location | # Mins | Bill | Invoice | |
| PCI | Credit | Exp Date | CVV | | | . . . | |
| CCPA | Personal | Business | Privacy | Collection | . . . | | |
| USGCI | Federal | Contact | Email | Billing | Physical | . . . | |

By using the matrix and implementing the matrix across the systems discussed herein, and by maintaining the updates and storing the updates to the security compliance requirements at the centralized repository 318, the technology described herein maintains the protection of the sensitive data across the system as it is transmitted from an API gateway and across the network.

Figure 4:
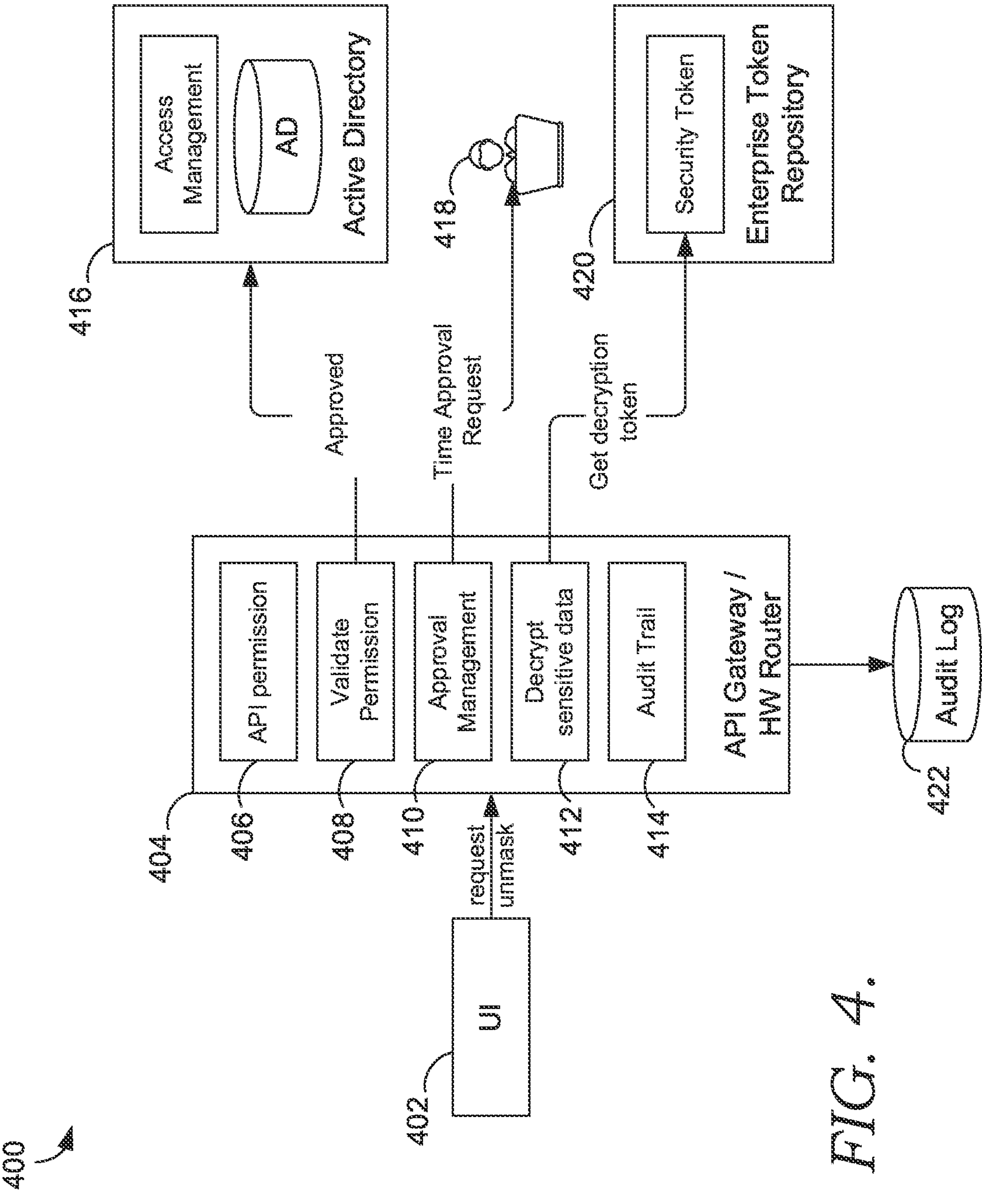
FIG. 4 illustrates an example operational environment for identifying redacted or otherwise secured sensitive data for un-redaction, in accordance with embodiments herein.

FIG. 4 illustrates an example operational environment 400 for identifying redacted or otherwise secured sensitive data for un-redaction. For example, example operational environment 400 comprises a user interface 402 that requests an unmasking of at least a portion of sensitive data from API gateway or router 404. The API gateway or router 404 comprises API permissions 406, validate permissions 408, approval manager 410, sensitive data decrypter 412, and audit trail 414. For example, the API gateway or router 404 may receive a decryption token from an enterprise token repository 420 in response to receiving approval at 418 and based on accessing an active directory at 416. Upon receiving the decryption token, the user interface may permit a user to un-redact at least a portion of the redacted sensitive data (e.g., via an un-redact button on a navigation menu). In embodiments, receiving the decryption token includes a single sign-on authentication scheme. In embodiments, a record of the un-redaction may be stored at an offline database.

Figure 5:
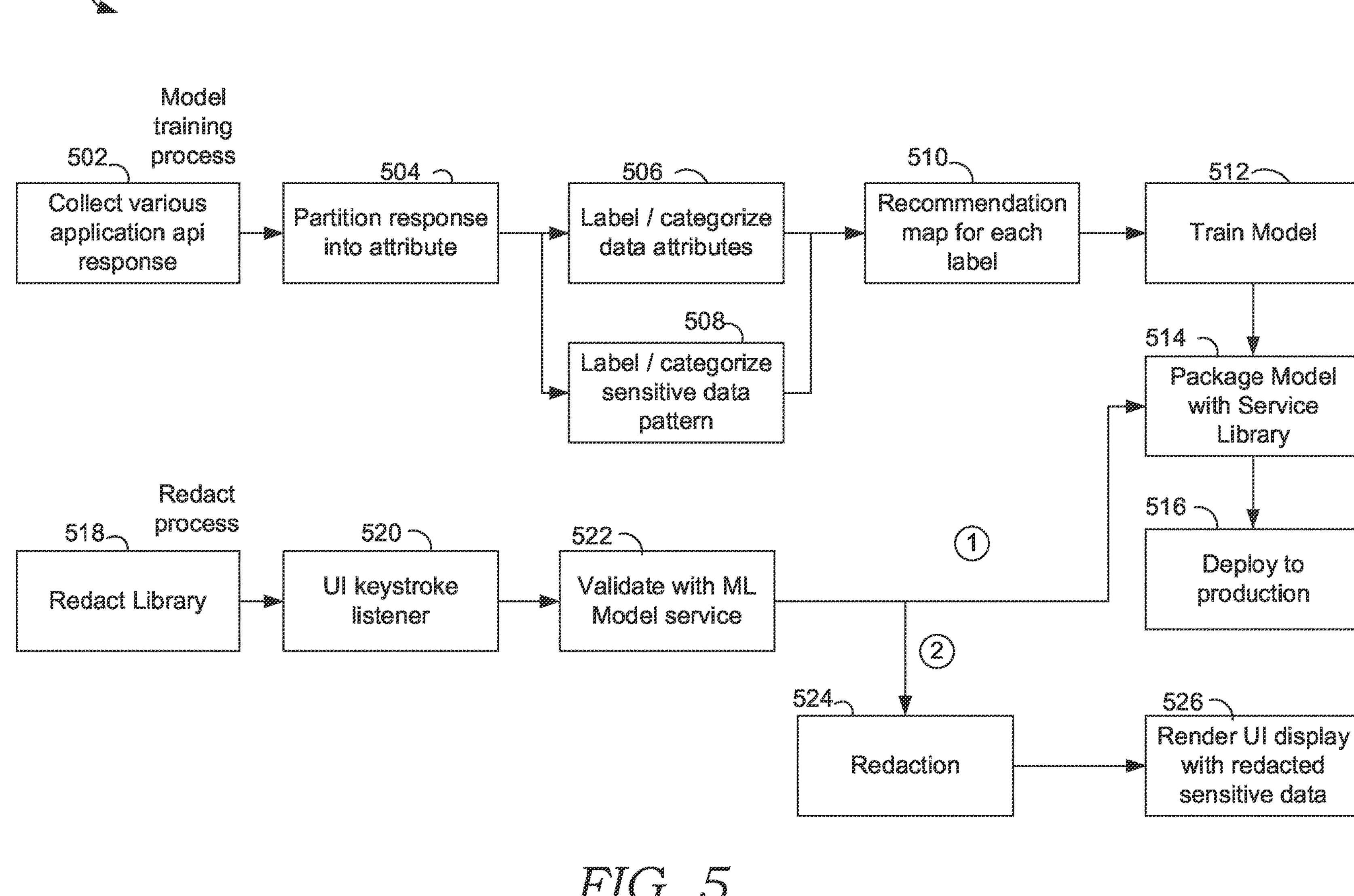
FIG. 5 illustrates an example operational environment for machine learning model training and model execution for detecting and securing sensitive data, in accordance with embodiments herein.

FIG. 5 illustrates rates an example operational environment 500 for machine learning model training and model execution for detecting and securing sensitive data. For example, at 502, a plurality of API requests and responses are collected. The plurality of API requests may be for a security token for encrypting data, and the plurality of API responses may include encryption data (e.g., asymmetric or symmetric encryption data). In embodiments, the API requests may be from a plurality of applications, each hosted by one or more container orchestration platforms. In embodiments, the API responses may be from an enterprise token repository.

At 504, the API responses, API requests, or one or more combinations thereof are partitioned into one or more attributes (e.g., values or characters associated with a name or description) corresponding to the sensitive data. In some embodiments, the API responses, API requests, or one or more combinations thereof are partitioned based on a particular format associated with numbers (e.g., a credit card number, a social security number, a telephone number, and numbers corresponding to a particular biometric). In some embodiments, the API responses, API requests, or one or more combinations thereof are partitioned based on one or more compliance standards for sensitive data (e.g., Customer Proprietary Network Information).

At 506, the partitioned API responses, API requests, or one or more combinations thereof are labeled or categorized based on attribute and at 508, the partitioned API responses, API requests, or one or more combinations thereof are labeled or categorized based on the type of sensitive data (e.g., SSN, phone number). In some embodiments, each of the partitioned API responses, API requests, or one or more combinations thereof can be labeled based on one or more format patterns of the sensitive data (e.g., a telephone number format having an area code, a three digit code, and a four digit code; or a telephone number that also includes a country code). In some embodiments, each of the partitioned API responses, API requests, or one or more combinations thereof can be labeled based on one or more of the attributes or based on the type of sensitive data (e.g., credit card CVV code, credit card expiration date).

At 510, a recommendation can be made based on each label. For example, the recommendation may be to apply a masking technique to the first five numbers of the social security number. As another example, the recommendation may be to apply a masking technique to all of the numbers of a credit card number except the last four numbers. In some embodiments, the recommendation may be for a particular type of encryption (e.g., a combination of a public and private key) based on each label. In some embodiments, the particular type of encryption may be based on a plurality of labels for a particular type of sensitive data. In some embodiments, the recommendation may include a particular type of cryptographic key (e.g., a hash function) for a particular type of encryption.

At 512, one or more machine learning models are trained based on the partitioning at 504, the labeling at 506, 508, the recommendation at 510, or one or more combinations thereof. By training the one or more machine learning models, the one or more machine learning models can thereafter recognize a plurality of digits (e.g., sixteen) for a credit card, for example. In embodiments, the trained one or more machine learning models can detect an expiration date of a credit card and a CVV code, for example. In one embodiments, upon training the one or more machine learning models using seventy percent of a training dataset and testing the one or more models with thirty percent of a test dataset, the one or more models can identify particular types of data (e.g., a credit card) with at least ninety five percent accuracy. In some embodiments, the one or more machine learning models can receive user feedback for implementation into further training of the one or more machine learning models. As such, the detected sensitive data can be redacted and encrypted based on a redaction process.

For example, at 518, a redaction library may be used to redact the detected sensitive data. At 520, a user interface keystroke listener may be used to listen to keystrokes on the at least one user device (e.g., at a particular website or application having one or more sensitive fields). At 522, a machine learning model service may be used to validate a detected pattern of the keystrokes that were identified as being an entry of sensitive data. Upon verification at 522, a package model with a service library may be used at 514 for subsequently deploying the system at 516 to production for the detection and protection of a plurality of websites and applications being accessed by a user device that is in communication with an edge router, for example. Additionally or alternatively, upon verification at 522, the sensitive data may be redacted at 524 and the user interface display may show the redacted sensitive data.

Figure 6:
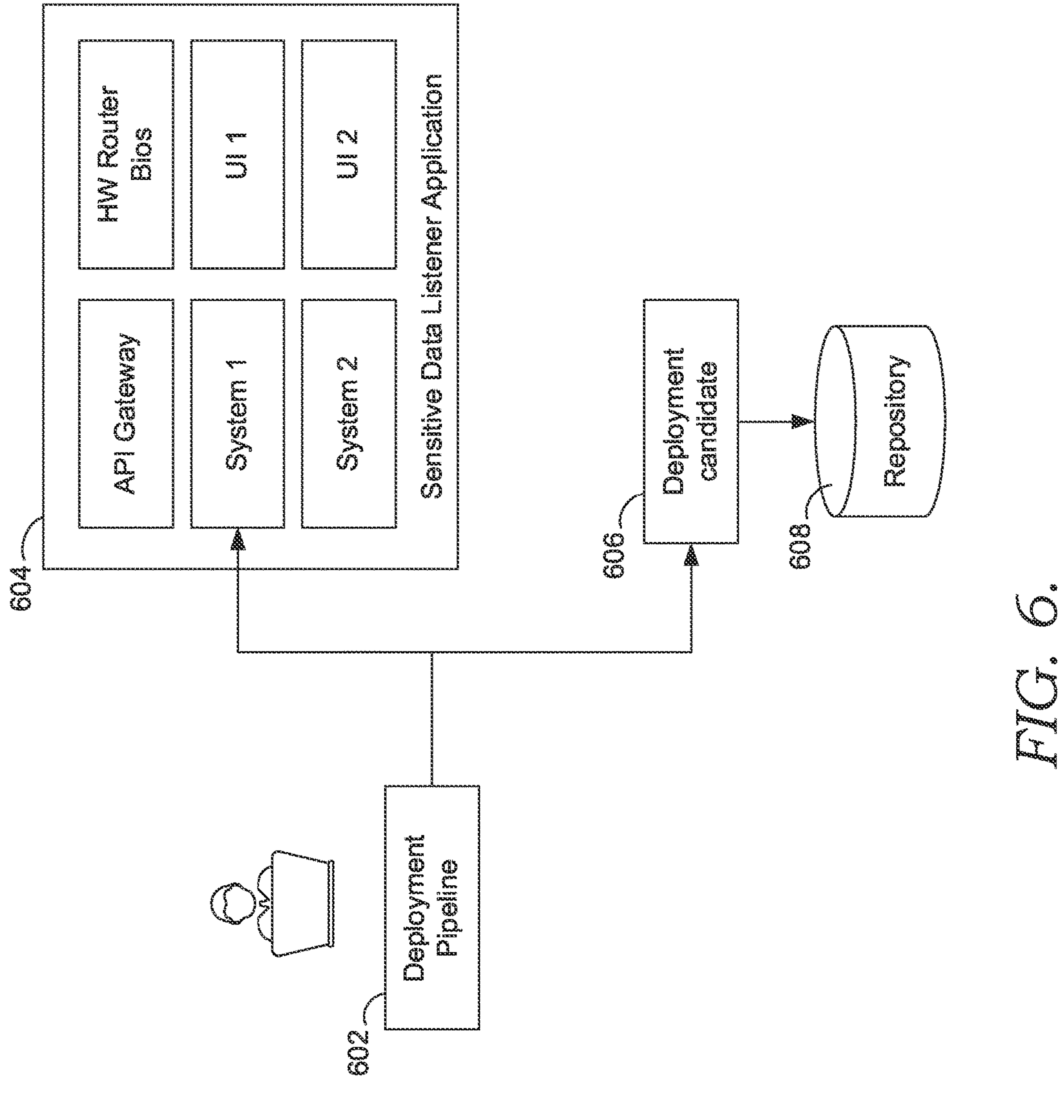
FIG. 6 depicts an example process for deploying a redaction library and machine learning model to one or more applications or systems that receive, transmit, or otherwise analyze sensitive data, in accordance with embodiments herein.

FIG. 6 depicts an example process 600 for deploying a redaction library and machine learning model to one or more applications or systems that receive, transmit, or otherwise analyze sensitive data. For example, the example process may include a deployment pipeline at 602 that is in communication with a sensitive data listener application 604 comprising an API gateway, edge router, a plurality of user interfaces, and a plurality of system operations. The deployment pipeline 602 may also be in communication with a deployment candidate 606, and the deployment candidate 606 may be used to store data (e.g., user profile data comprising encrypted sensitive data) at data store 608. In some embodiments, the sensitive data listener application 604 can redact and un-redact detected keystroke patterns or detected keystrokes within a particular sensitive field.

Figure 7:
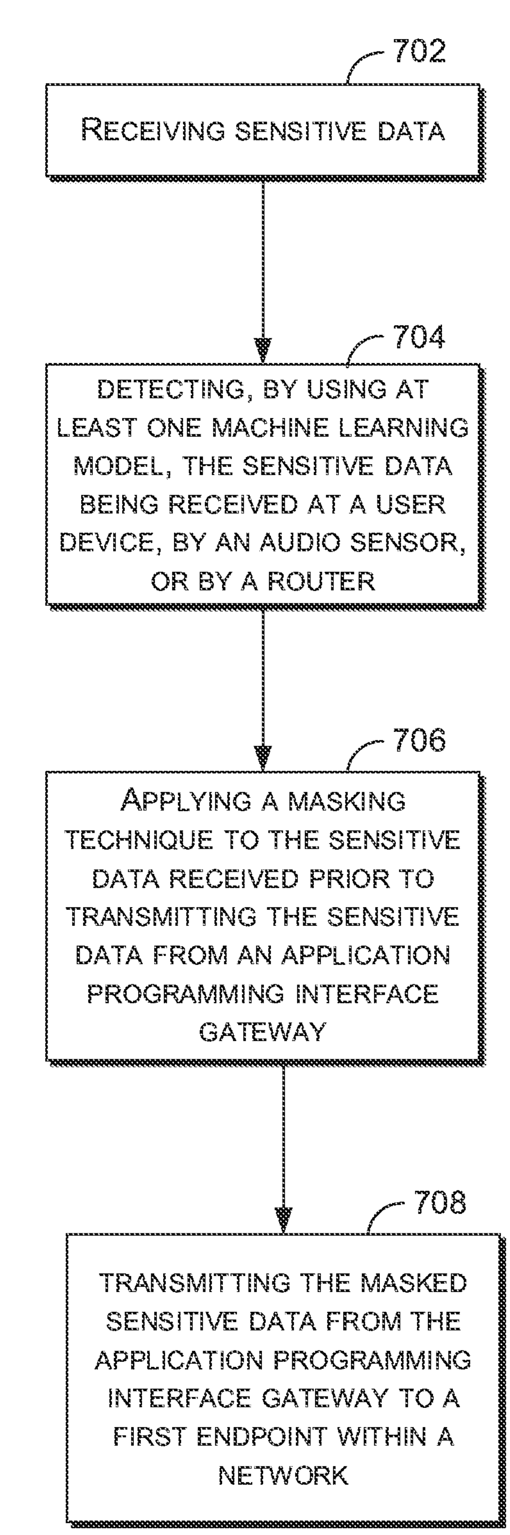
FIG. 7 depicts a flow diagram of an example method for dynamic session trace management for user equipment, in accordance with aspects herein.

FIG. 7 illustrates example flow diagram 700. At 702, sensitive data is received by a user device. In embodiments, the user device receives the sensitive data at an active user interface or an inactive user interface, at a sensitive field of an active or inactive user interface, by an audio sensor of a user device, by another method, or by one or more combinations thereof. In embodiments, as a user device receives data comprising sensitive data, a router can receive the data comprising the sensitive data from the user device. In some embodiments, the sensitive data is received in real-time or near real-time via a user interface application previously downloaded on the user device. Continuing the example, the application previously downloaded on the user device may be managed by a container orchestration platform (e.g., such as the Kubernetes clusters 214,216 of FIG. 2, for example). In an embodiment, the sensitive data is received by an active or inactive user interface comprising one or more sensitive fields that correspond to one of a plurality of applications managed by one or more container orchestration platforms.

At 704, the sensitive data received is detected using one or more machine learning models. In some embodiments, the one or more machine learning models detects the sensitive data based on a user entering the sensitive data within a sensitive field of an active or inactive user interface. In some embodiments, the one or more machine learning models detects the sensitive data based on receiving the sensitive data at the user device, based on a router receiving the sensitive data, or one or more combinations thereof. In some embodiments, the one or more machine learning models detects the sensitive data based on one or more application programming interface requests. For example, the one or more API requests may be transmitted by an application corresponding to the user device, and wherein the API request is for a security token for encryption.

In some embodiments, natural language processing is also used in addition to the one or more machine learning models to detect the sensitive data. In some embodiments, the sensitive data is detected based on listening to keystrokes on the at least one user device and identifying, via the machine learning model, a pattern of the keystrokes. In some embodiments, a second sensitive field on another active user interface that corresponds to one of a second plurality of applications managed by a second container orchestration platform is detected by using the one or more machine learning models.

In some embodiments, a plurality of application programming interface requests (e.g., requests for a security token for encryption) are used to train the machine learning model. Continuing the example, each of the API requests may be partitioned based on at least one attribute. In addition, the at least one attribute can be labeled based on a type of the sensitive data corresponding to each of the plurality of application programming interface requests for training the machine learning model. In some embodiments, the one or more machine learning models are trained using a plurality of API requests from a plurality of applications managed by at least one container orchestration platform, wherein the plurality of API requests are partitioned by attribute, and wherein each partitioned application programming interface request is labeled based on a format pattern.

At 706, a masking technique is applied to at least a portion of the sensitive data received (e.g., by the user device, the router, an API gateway, or one or more combinations thereof) prior to transmitting the sensitive data from the API gateway, prior to transmitting the sensitive data from the router, prior to transmitting the sensitive data to a layer within a network, or a combination thereof. The masking technique is applied based on detecting that the data being received includes the sensitive data. In some embodiments, the masking technique comprises redacting at least a portion of the sensitive data as the sensitive data is being received on the active user interface. For example, the sensitive data may be redacted from display on an active user interface of the user device. The masking technique can also comprise encrypting or tokenizing the sensitive data prior to transmitting the sensitive data from the API gateway, from the router, or a combination thereof.

At 708, the encrypted sensitive data is transmitted from the API gateway to a first endpoint within a network. In some embodiments, the encrypted sensitive data is transmitted from the first endpoint to a second endpoint within the network. In some embodiments, the encrypted sensitive data is transmitted from the first endpoint or the second endpoint to a plurality of other endpoints within the network.

Example User Device

Having described the example embodiments discussed above of the presently disclosed technology, an example operating environment of an example user device (e.g., user devices 102A, 102B of FIG. 1) is described below with respect to FIG. 8. User device 800 is but one example of a suitable computing environment, and is not intended to suggest any particular limitation as to the scope of use or functionality of the technology disclosed. Neither should user device 800 be interpreted as having any dependency or requirement relating to any particular component illustrated, or a particular combination of the components illustrated in FIG. 8.

Figure 8:
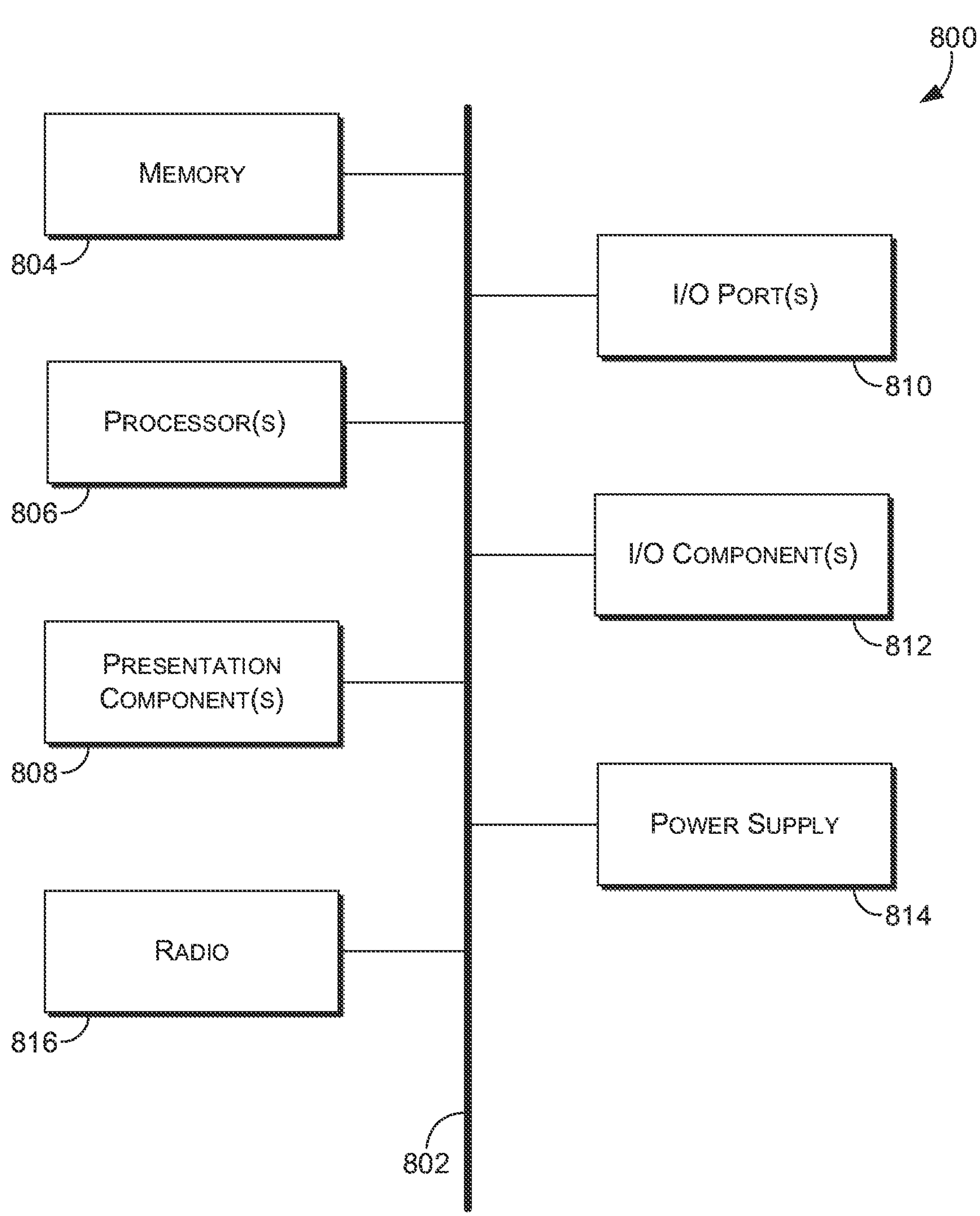
FIG. 8 depicts an example user device suitable for use in implementations of the present disclosure, in accordance with aspects herein.

As illustrated in FIG. 8, example user device 800 includes a bus 802 that directly or indirectly couples the following devices: memory 804, one or more processors 806, one or more presentation components 808, one or more input/output (I/O) ports 810, one or more I/O components 812, a power supply 814, and one or more radios 816.

Bus 802 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component, such as a display device, to be an I/O component. Also, processors have memory. Accordingly, FIG. 8 is merely illustrative of an exemplary user device that can be used in connection with one or more embodiments of the technology disclosed herein.

User device 800 can include a variety of computer-readable media. Computer-readable media can be any available media that can be accessed by user device 800 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 800. Computer storage media does not comprise signals per se. Communication media typically embodies computer-readable instructions, data structures, program modules, or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 804 includes computer storage media in the form of volatile and/or nonvolatile memory. The memory 804 may be removable, non-removable, or a combination thereof. Example hardware devices of memory 804 may include solid-state memory, hard drives, optical-disc drives, other hardware, or one or more combinations thereof. As indicated above, the computer storage media of the memory 804 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 800, or one or more combinations thereof.

The one or more processors 806 of user device 800 can read data from various entities, such as the memory 804 or the I/O component(s) 812. The one or more processors 806 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 806 can execute instructions, for example, of an operating system of the user device 800 or of one or more suitable applications.

The one or more presentation components 808 can present data indications via user device 800, another user device, or a combination thereof. Example presentation components 808 may include a display device, speaker, printing component, vibrating component, another type of presentation component, or one or more combinations thereof. In some embodiments, the one or more presentation components 808 may comprise one or more applications or services on a user device, across a plurality of user devices, or in the cloud. The one or more presentation components 808 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 808 can present a visualization that compares a plurality of inspections of one or more cores of a central processing unit and a visualization of each task of each of the plurality of inspections.

The one or more I/O ports 810 allow user device 800 to be logically coupled to other devices, including the one or more I/O components 812, some of which may be built in. Example I/O components 812 can include a microphone, joystick, game pad, satellite dish, scanner, printer, wireless device, and the like. The one or more I/O components 812 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 808 on the user device 800. In some embodiments, the user device 800 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 800 may, additionally or alternatively, be equipped with accelerometers or gyroscopes that enable detection of motion. In some embodiments, the output of the accelerometers or gyroscopes may be provided to the one or more presentation components 808 of the user device 800 to render immersive augmented reality or virtual reality.

The power supply 814 of user device 800 may be implemented as one or more batteries or another power source for providing power to components of the user device 800. In embodiments, the power supply 814 can include an external power supply, such as an AC adapter or a powered docking cradle that supplements or recharges the one or more batteries. In aspects, the external power supply can override one or more batteries or another type of power source located within the user device 800.

Some embodiments of user device 800 may include one or more radios 816 (or similar wireless communication components). The one or more radios 816 can transmit, receive, or both transmit and receive signals for wireless communications. In embodiments, the user device 800 may be a wireless terminal adapted to receive communications and media over various wireless networks. User device 800 may communicate using the one or more radios 816 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 816 may facilitate communication via radio frequency signals, frames, blocks, transmission streams, packets, messages, data items, data, another type of wireless communication, or one or more combinations thereof. The one or more radios 816 may be capable of transmitting, receiving, or both transmitting and receiving wireless communications via mmWaves, FD-MIMO, massive MIMO, 3 G, 4 G, 5 G, 6 G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system comprising:

at least one machine learning model;

one or more processors; and computer memory storing computer-usable instructions that, when executed by the one or more processors, perform operations comprising:

detecting, by using the at least one machine learning model, an entry of sensitive data at a sensitive field on an active user interface;

based on detecting the entry of the sensitive data at the sensitive field, redacting at least a portion of the sensitive data as the sensitive data is being received on the active user interface;

tokenizing the sensitive data such that the sensitive data is tokenized prior to being transmitted;

receiving, at an application programming interface (API) gateway or the router, a request from a user interface to unmask at least a portion of the sensitive data;

validating permissions for unmasking the at least portion of the sensitive data based on accessing an active directory;

receiving approval and a decryption token from an enterprise token repository in response to the approval; and permitting un-redaction of at least a portion of the sensitive data via an un-redact button on a navigation menu, wherein a record of the un-redaction is stored at an offline database.

2. The system of claim 1, further comprising detecting the entry of the sensitive data at the sensitive field using natural language processing.

3. The system of claim 1, further comprising determining that a website corresponding to the active user interface and the sensitive field is malicious by comparing a URL and letterhead associated with the website.

4. The system of claim 3, further comprising preventing, by a network router and based on determining that the website is malicious, transmission of the sensitive data prior to transmitting the sensitive data from an application programming interface gateway.

5. The system of claim 4, further comprising transmitting an alert to a user device corresponding to the entry of the sensitive data at the sensitive field, wherein the alert indicates that the website is malicious.

6. The system of claim 1, further comprising:

causing the tokenized sensitive data to be transmitted to a first endpoint within a network that includes a network layer; and causing the tokenized sensitive data to be transmitted from the first endpoint to a second endpoint within the network.

7. The system of claim 1, further comprising validating, based on user permissions, a request to un-redact at least a portion of the sensitive data; and based on the validation, un-redacting the at least portion of the sensitive data for display on the active user interface.

8. The system of claim 1, wherein the sensitive data is detected based on listening to keystrokes on the active user interface and identifying, by the at least one machine learning model, a pattern of the keystrokes.

9. The system of claim 1, further comprising determining that a website corresponding to the active user interface is malicious based on an IP destination address not having access to an edge node of a network, and preventing transmission of the sensitive data from a network router prior to transmitting the sensitive data from the application programming interface gateway.

10. The system of claim 1, wherein detecting the entry of the sensitive data comprises using natural language processing to detect a medical professional identifier having a prefix or suffix associated with an individual's name, wherein the prefix or suffix comprises at least one of "Dr.", "MD", or "RN".

11. A computerized method for centralized and decentralized data protection, the method comprising:

detecting, by an application programming interface (API) gateway using at least a machine learning model trained using a plurality of application programming interface requests, that data being received by a router includes sensitive data;

based on detecting that the data being received by the router includes the sensitive data, applying, by the API gateway, a masking technique comprising tokenization to at least a portion of the sensitive data prior to transmitting the sensitive data from the API gateway to a network layer;

transmitting, by the API gateway, at least the portion of the masked sensitive data to the network layer;

receiving, at an application programming interface (API) gateway or the router, a request from a user interface to unmask at least a portion of the sensitive data;

validating permissions for unmasking the at least portion of the sensitive data based on accessing an active directory;

receiving approval and a decryption token from an enterprise token repository in response to the approval; and permitting un-redaction of at least a portion of the sensitive data via an un-redact button on a navigation menu, wherein a record of the un-redaction is stored at an offline database.

12. The computerized method of claim 11, wherein the masking technique comprises redacting the sensitive data from display on an active user interface of a user device.

13. The computerized method of claim 11, further comprising:

receiving the sensitive data from an application downloaded on at least one user device, wherein the application is managed by a container orchestration platform; and detecting that the data being received by the router includes the sensitive data based on an application programming interface request, from the application, for a security token for encryption.

14. The computerized method of claim 11, wherein the sensitive data is detected based on listening to keystrokes on at least one user device and identifying, via the machine learning model, a pattern of the keystrokes.

15. The computerized method of claim 11, further comprising: detecting, by using the machine learning model, that sensitive data is being entered at a sensitive field within a user interface; encrypting one or more attributes of the sensitive data based on a type of sensitive data being encrypted; and requesting a security token from an enterprise token repository for encrypting the sensitive data prior to transmitting the sensitive data across a layer of a network.

16. The computerized method of claim 11, wherein the machine learning model is deployed on a Kubernetes master node that employs sensitive data detection rules to orchestrate worker nodes and pods of a Kubernetes cluster, wherein the worker nodes and pods are associated with a network provider, and wherein the Kubernetes master node detects the sensitive data based on an input received at a sensitive field on an active user interface.

17. Non-transitory computer-readable media having computer-usable instructions embodied thereon that, when executed by a processor, perform operations for centralized and decentralized data protection, the operations comprising:

receiving, by a router and from a user device, sensitive data;

detecting, by using at least a machine learning model, the sensitive data based on an entry of the sensitive data at the user device and based on receiving the sensitive data at the router;

based on detecting the sensitive data, applying a masking technique comprising tokenization to at least a portion of the sensitive data received prior to transmitting the sensitive data to a network layer within a network, such that the sensitive data is masked once it enters the network layer and as it is transmitted from the network layer;

receiving, at an application programming interface (API) gateway or the router, a request from a user interface to unmask at least a portion of the sensitive data;

validating permissions for unmasking the at least portion of the sensitive data based on accessing an active directory;

receiving approval and a decryption token from an enterprise token repository in response to the approval; and permitting un-redaction of at least a portion of the sensitive data via an un-redact button on a navigation menu, wherein a record of the un-redaction is stored at an offline database.

18. The non-transitory computer-readable media of claim 17, wherein the sensitive data is detected based on the entry of the sensitive data within a sensitive field of an active user interface.

19. The non-transitory computer-readable media of claim 17, wherein the sensitive data is detected based on an application programming interface request, from an application corresponding to the user device, for a security token for encryption.

* * * * *